United States Patent
Lorenz et al.

(10) Patent No.: US 8,766,774 B2
(45) Date of Patent: Jul. 1, 2014

(54) RFID REACTION TIME REDUCTION

(75) Inventors: Dirk Lorenz, Wetter (DE); Anatoly Grinberg, Brighton, MA (US)

(73) Assignee: Rockwell Automation Germany GmbH & Co. KG, Wuppertal (DE)

(*) Notice: Subject to any disclaimer, the term of this patent is extended or adjusted under 35 U.S.C. 154(b) by 963 days.

(21) Appl. No.: 12/560,818

(22) Filed: Sep. 16, 2009

(65) Prior Publication Data

US 2010/0073145 A1 Mar. 25, 2010

(30) Foreign Application Priority Data

Sep. 19, 2008 (EP) .................................... 08016564

(51) Int. Cl.
*G06K 7/00* (2006.01)
*H04Q 5/22* (2006.01)

(52) U.S. Cl.
USPC ..................... 340/10.1; 340/10.2; 340/572.1

(58) Field of Classification Search
CPC ............................... G06K 7/0008; H04Q 5/22
USPC ........ 340/10.1, 10.2, 10.4, 5.61, 572.1, 572.4
See application file for complete search history.

(56) References Cited

U.S. PATENT DOCUMENTS

| | | | | |
|---|---|---|---|---|
| 5,537,105 A * | 7/1996 | Marsh et al. | | 340/10.32 |
| 5,621,412 A * | 4/1997 | Sharpe et al. | | 340/10.33 |
| 5,699,066 A | 12/1997 | Marsh et al. | | |
| 5,909,178 A * | 6/1999 | Balch et al. | | 340/572.4 |
| 6,104,279 A * | 8/2000 | Maletsky | | 340/10.41 |
| 2002/0024422 A1* | 2/2002 | Turner et al. | | 340/10.3 |
| 2005/0170793 A1* | 8/2005 | Nakagawa | | 455/116 |
| 2010/0060430 A1* | 3/2010 | Lorenz | | 340/10.1 |

FOREIGN PATENT DOCUMENTS

EP 1562133 A2 8/2005

OTHER PUBLICATIONS

U.S. Appl. No. 12/550,535, filed Aug. 31, 2009, Dirk Lorenz.
European Search Report for EP08016564.0 dated Apr. 6, 2009.

* cited by examiner

*Primary Examiner* — Edwin Holloway, III
(74) *Attorney, Agent, or Firm* — Boyle Fredrickson, S.C.

(57) ABSTRACT

A method, system, and a control device are provided for reducing RFID reaction times. A control unit receives a data signal, which comprises a code signal if a passive RFID transponder is located in the carrier field of an RFID reader. The code represents the identification code of the passive RFID transponder. The carrier field is disabled to reset the data signal, and thereafter enabled to receive a first portion of the code signal only. The code of the passive RFID transponder is then validated on the basis of said first portion of the code signal only.

14 Claims, 4 Drawing Sheets

RFID REACTION TIME REDUCTION

CROSS-REFERENCE TO RELATED APPLICATIONS

This application claims priority to European Patent Application No. EP08016564.0, filed Sep. 19, 2008, the entire contents of which is incorporated herein by reference.

BACKGROUND OF THE INVENTION

1. Field of the Invention

The invention relates to RFID systems, in particular to RFID systems for security or safety applications. More specifically, the present invention relates to a method, system and an apparatus for reducing the reaction time of an RFID system by repeatedly disabling and enabling the carrier field of an RFID reader.

2. Description of the Related Art

RFID is an acronym for Radio Frequency Identification. RFID is one member in the family of Automatic Identification and Data Capture (AIDC) technologies and is a fast and reliable means of identifying just about any material object. It relies on storing and remotely retrieving data. Primarily, the two main components involved in a radio frequency identification system are the transponder (tags that are attached to the object) and the interrogator (RFID reader). Communication between the RFID reader and tags occurs wirelessly and generally does not require a line of sight between the devices. Some transponders can be read from several meters away.

Most RFID transponders contain at least two parts. One is an integrated circuit (IC) for storing and processing information, modulating and demodulating a (RF) signal, and other specialized functions. The second is an antenna for receiving and transmitting a signal. Accordingly, an RFID transponder, which is considered as a next generation barcode, is a miniscule microchip that is attached to an antenna. The transponders come in a wide variety of sizes, shapes, and forms and can be read through most materials with the exception of conductive materials like water and metal. With modifications and positioning, even these obstacles can be overcome.

Tags may be active or passive. Passive tags are generally smaller, lighter, and less expensive than those that are active, they can be applied to objects in harsh environments, they are maintenance free, and they will last for years. These transponders are only activated when within the response range of a reader. The RFID reader emits a low power electromagnetic wave field which is used to power up the tag to facilitate passing on of any information that is contained on the transponder chip.

Active tags differ in that they incorporate their own power source, wherein the tag is a transmitter rather than a reflector of radio frequency signals, which enables a broader range of functionality, like programmable and read/write capabilities.

An RFID reader typically contains a transmitter and receiver module, a control unit, and a coupling element (antenna). Such a typical reader has three main functions: energizing, demodulating, and decoding. In addition, readers can be fitted with an additional interface that converts the radio waves returned from the RFID tag into a form that can then be passed on to another system like a computer, microcontroller unit, or any programmable logic controller.

In safety engineering, the RFID technology is used, in particular, for non-contact switch devices, e.g., for door monitoring. Here, a predetermined device pair composed of a passive transponder and a reader may be attached to the door and a fixed point of reference, respectively. This facilitates monitoring whether a door is closed or open, e.g., in an environment where it is crucial that all doors of the room are closed before safety critical operations are performed inside the room. RFID may also be utilized for access control and general security purposes, providing authentication tags for opening a security door or enabling operation of a specific machine.

According to a conventional method of employing RFID technology, the RFID reader generates a carrier field. Once an active or passive transponder with an authorized identification code enters the response range of the RFID reader, it either transmits an electromagnetic signal comprising the ID code or influences the carrier field, for example, by means of load modulation. The reader attempts to determine a code from the response signal received from the transponder. Once a code is identified, the reader determines whether the identified code is valid. This may conventionally be accomplished by comparing the identified code with a code stored in the reader device. The process is repeated as long as the carrier field is powered. If a valid code is determined, the controller module of the RFID reader or an MCU connected thereto provides a predefined control signal. This control signal may be utilized to, for example, unlock a door or indicate to a monitoring system whether a specific door is open or closed.

In case of a passive transponder, the transponder is only provided with sufficient energy from the RF field of the reader if the transponder is within a certain energy transfer range of the reader. Once enough energy is transferred from the RF field to the transponder, the transponder starts to provide a response signal comprising its identification code to the RFID reader. If the transponder is within a response range of the reader, the provided response signal allows to determine the identification code as valid. Accordingly, once the transponder has received enough energy to start to transmit its code and has entered the response range of the reader, the reader device will be able to determine the code as valid and facilitate the provision of the assigned control signal.

This kind of RFID system suffers from the basic problem that in the border area of the response range of the reader device, transponders change their state from a state of not being able to transmit a valid code to a state of providing a response signal allowing to detect the valid identification code of the transponder, and vice versa. Conventionally, the identification code of the transponder is programmed into the transponder integrated circuit. Normally, the code consists of one bank with four bytes. These bytes are emitted for example in Manchester code once the transponder is in the carrier field of the RFID reader and has sufficient energy. The Manchester code consists of a header byte, and the code which generally consists of at least four bytes is sent continuously by repeating the sequence of header and code bytes.

If the distance between the transponder and the RFID reader is too large, i.e. the transponder is not located within the response range of the reader, but the transponder is provided with sufficient power to send the data, the control unit or MCU associated with the RFID reader cannot read the valid data. If the transponder is approaching the reader, the received code is read and may be stored until a first header byte is validly detected. Subsequently, the control unit or MCU can read the code and validate the code. This lengthy procedure negatively impacts the reaction time of the RFID system.

BRIEF DESCRIPTION OF THE INVENTION

According to one embodiment of the present invention, a method, system and a control device reducing the reaction time of an RFID system utilizing a passive RFID transponder is provided.

A method of reducing RFID system reaction time is provided. The method comprises receiving a data signal. The data signal comprises a code signal representing the code of a passive RFID transponder if the passive RFID transponder is located in the carrier field of an RFID reader. The method comprises the steps of disabling the carrier field of the RFID reader as necessary to reset the data signal, including resetting a transponder, enabling the carrier field to receive a first portion of a code signal if a passive RFID transponder is located in the carrier field of the RFID reader, and validating the code of the passive RFID transponder on the basis of the received first portion of the code signal.

According to an aspect of the present invention, a control signal is provided on the basis of the first portion of the code signal. The first portion of the code signal is a header or comprises a header and the first byte of the identification code of the passive RFID transponder comprising a total of at least four bytes.

According to aspects of the present invention, the carrier field is disabled after the first portion of the code signal is received or after the carrier field is enabled for a predetermined period of time.

According to aspects of the present invention, the code of the passive RFID transponder is transmitted in Manchester code. The provided control signal is a safety control signal or a security control signal.

According to another aspect of the present invention, the disabling and enabling of the carrier field is performed in a periodic manner.

According to yet another aspect of the present invention, the carrier field is enabled and disabled in accordance with a carrier enable signal provided to the RFID reader.

According to yet another aspect of the present invention, an RFID system control device is provided. The device comprises means for receiving a data signal, which comprises a code signal if a passive RFID transponder is located in the carrier field of an RFID reader, the code signal representing the code of the passive RFID transponder; means for providing a carrier enable signal for periodically disabling the carrier field to reset the data signal and periodically enabling the carrier field to receive a first portion of the code signal; and means for validating the code of the passive RFID transponder on the basis of the first portion of the code signal.

According to aspects of the present invention, the device further comprises means for averaging results of the validating and/or means for providing a control signal on the basis of the first portion of the code signal.

According to yet another aspect, the control signal provided by the device indicates the status of a monitored non-contact safety switch.

According to yet another aspect of the present invention, an RFID system is provided. The system comprises a microcontroller unit for providing a carrier enable signal and receiving a data signal, a passive RFID transponder including a code for providing a response signal comprising the code when being located in a carrier field, an RFID reader for generating a carrier field in response to a received carrier enable signal, receiving a response signal comprising a code, and providing a data signal comprising a code signal representing the code to the microcontroller unit. The carrier field, in response to the received carrier enable signal, is periodically disabled to reset the data signal and periodically enabled to receive a first portion of the code signal.

According to still another aspect of the present invention, it is not necessary to use all four bytes of the identification code of the transponder. For the identification, it is, for example, enough to check the header and one byte of the code. The present invention is further based on the notion that after a reset of the transponder, i.e. after enough energy is transferred to the transponder after newly generating a carrier field, the transponder sends the code, e.g. in Manchester coding, starting with the header. Accordingly, a control unit or microcontroller unit does not have to find the header, because the transponder by definition starts with sending the header. Therefore, after enabling the carrier field, the control unit or microcontroller unit expects the header and after that the code portion.

According to yet another aspect of the present invention, the carrier field is disabled to reset the system and in particular reset the received data signal. It is then sufficient to read only the header or the first byte after the header or both and validate this portion of the identification code. Accordingly, it is not necessary to wait until all data is transmitted including receipt of a valid header. This saves significant time in reading the transponder code and thus reduces the reaction time of the RFID system appreciably.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
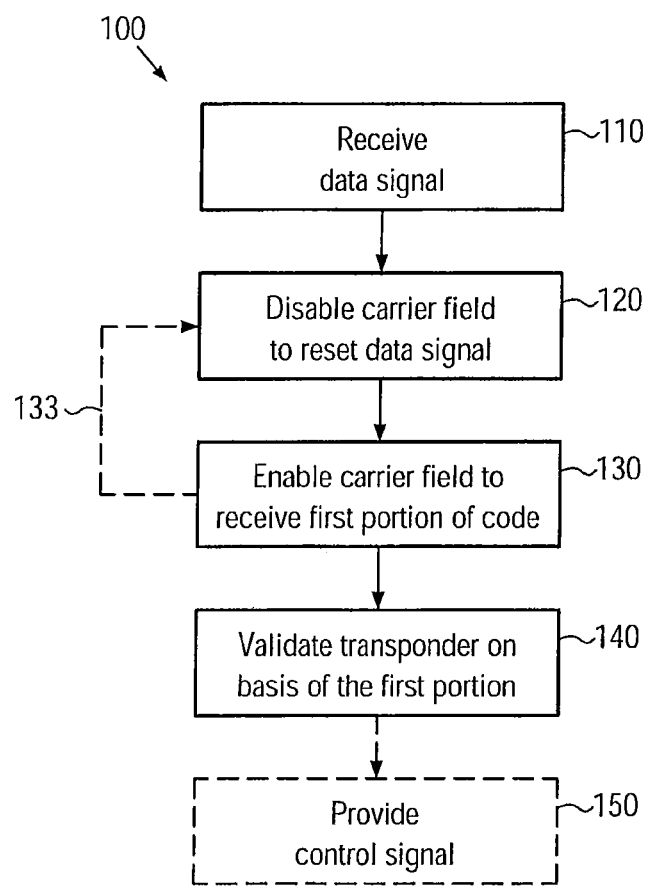
FIG. 1 is a flowchart illustrating a method of reducing RFID system reaction time according to an embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Exemplary embodiments of the present invention will now be described in detail with reference to the annexed drawings.

Figure 4:
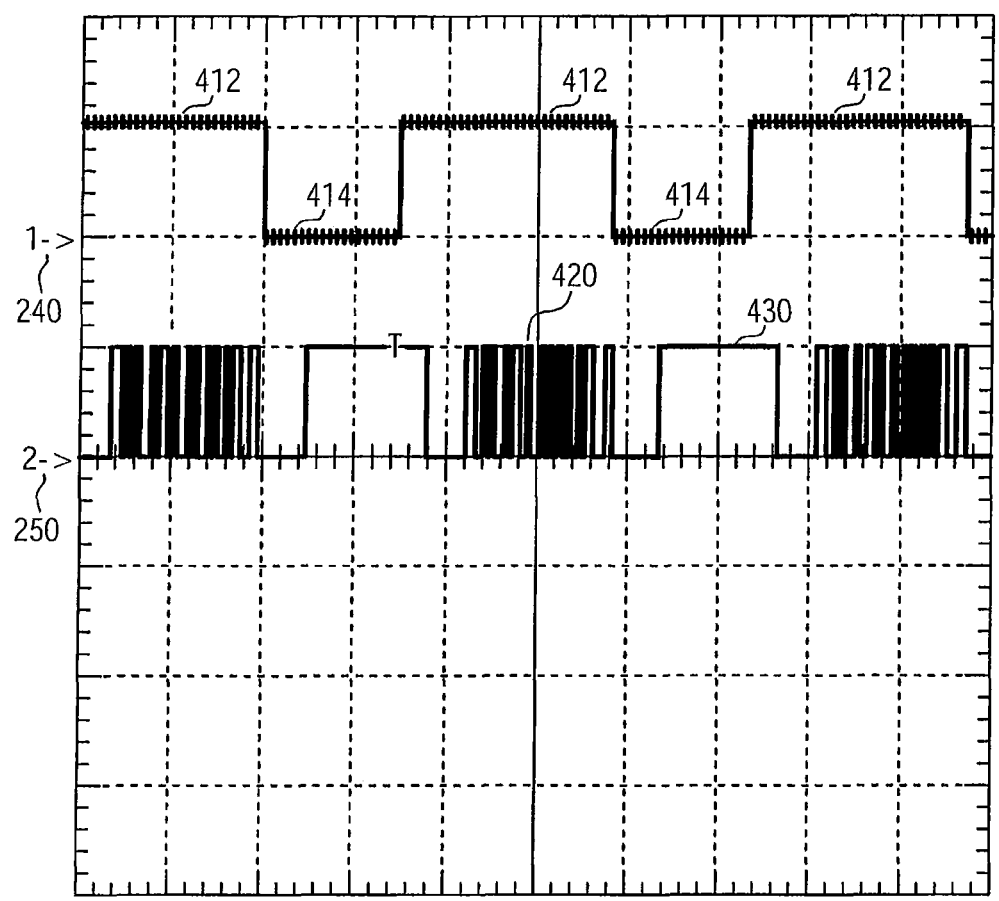
FIG. 4 is a diagram illustrating the provision of a carrier enable signal for periodically enabling and disabling a carrier field of an RFID reader and a received data signal comprising a code signal according to embodiments of the present invention.

FIG. 1 is a flow chart illustrating a method of reducing RFID system reaction time according to an embodiment of the present invention. A data signal is received, step 110. The data signal comprises a code signal if a passive RFID transponder is located in the carrier field of an RFID reader. The code signal represents the code of the passive RFID transponder. With further reference to FIG. 4 showing a data signal 250 and a carrier enable signal 240 according to an embodiment of the present invention, the data signal 250 includes a code signal at 420. According to the illustrated embodiment, the receiving circuit of the RFID reader may comprise a Schmitt trigger. Therefore, as can be seen from the data signal 250 depicted in FIG. 4, once the carrier enable signal 240 is switched off starting a period 414 of disabling the carrier field, step 120, the derived data signal 250 first drops to "0" and after a certain period of time returns to the binary default value of "1", as indicated with 430. In this manner, the carrier field is disabled to reset the data signal. That is, the data signal 250 returns to its default binary value of "1" once the system is reset, including resetting the transponder.

Subsequently, the carrier field is enabled to receive a first portion of the code signal, step 130. With reference to FIG. 4, the carrier field is enabled by switching on the carrier enable signal 240 during periods 412. The first portion of the code signal is then received within periods 412. According to an embodiment of the present invention, once the predetermined first portion of the code signal has been received or could have been received and read by the control unit or microcontroller unit, the carrier field is again disabled to reset the data signal. Control accordingly returns to step 120. This may be implemented in a periodic manner, as indicated in FIG. 1 with 133. The code of the passive RFID transponder is then validated on the basis of the first portion of the code signal, step 140. A control signal may then be provided on the basis of the received first portion of the code signal, step 150, which is shown in relation to an embodiment of the present invention.

An exemplary application according to an embodiment of the present invention is a door monitoring system, where the provided control signal indicates whether a door is shut or open in a safety-critical environment. Further, the status of a safety-critical machine could be monitored by means of an RFID system according to embodiments of the present invention, wherein a control signal provided on the basis of the first portion of the code signal indicates one of at least two possible conditions of the safety-critical machine.

According to an embodiment of the present invention, it is sufficient to only receive a header byte of a Manchester code as a first portion of the code signal and validate the code of the passive RFID transponder on the basis of the header byte only. For example, the hexadecimal value of the header byte may be "e8h", which corresponds to a bit sequence of "11101000". In this embodiment the control unit or microcontroller unit associated with the RFID reader is in knowledge of said header byte value. It thus can detect the header bit sequence from the received data signal bit sequence if a valid passive RFID transponder using this header byte is located in the carrier field of the RFID reader and is also located within the response range of the RFID reader allowing error-free detection of the header byte from the received and processed Manchester code. Accordingly, it is possible to validate whether the header byte is received from an authorized RFID transponder and received without errors, thus indicating that the passive RFID transponder is within a certain defined range of the reader. In another embodiment, the first portion of the code signal on the basis of which the code of the passive RFID transponder is validated, corresponds to the header and the first byte of the identification code of the passive RFID transponder only although the code of the passive RFID transponder includes at least four bytes.

Typically, the bit sequence of the identification code of the passive RFID transponder is not modulated on the carrier signal on a period-by-period basis, but instead one bit of the transponder code is mapped to a range of carrier signal periods. Conventional low-cost RFID reader devices are configured such that a Manchester or bi-phase coding with a data rate of up to fcarrier/25 may be processed, which for a carrier frequency of 120 kHz corresponds to a maximum of 4,800 bits per second. The maximum data rate is influenced by response times, e.g. of the employed lowpass filter in the receiving portion of the RFID reader. Therefore, 4 to 10 bytes of a received code signal correspond to several ten milliseconds. The present invention allows to reduce the reaction time, by quickly resetting the data signal and the passive RFID transponder and only receiving one or two bytes thereafter. Thus, the time period for the validation of the received data signal corresponds to e.g. three or four bytes, saving up to 75 percent of the reaction time versus the conventional method.

According to embodiments of the present invention, the carrier field can be disabled after the defined first portion of the code signal has been received and detected. The carrier field may also be disabled after enabling the carrier field for a predetermined period of time. The associated control unit or microcontroller may validate any received code signal read during this predetermined period of time and thereafter the data signal is reset by disabling the carrier enable signal and resetting the passive RFID transponder. The process may then be repeated in a periodic manner to allow for quick detection of a valid code signal associated with a passive RFID transponder.

If a passive RFID transponder has accumulated enough energy, it starts with the provision of its code by influencing the carrier field, for example by means of load modulation, which may be accomplished by connecting a load resistor in accordance with the desired transmission data rate. If the transponder is outside the response range of the RFID reader, the code signal representing the transmitted code of the passive RFID transponder will be noisy and may not be successfully validated. Accordingly, it is determined that the received code is invalid and that a control signal provided by the RFID system remains in a state indicating that the transponder is outside of a defined response range. Once the transponder enters the response range, however, the code will be transmitted sufficiently flawless to be detected as a valid code. According to embodiments of the present invention, the reaction time of detecting a valid code is drastically reduced, thereby allowing to more quickly switch a provided signal between an off and an on-state and vice versa.

Figure 2:
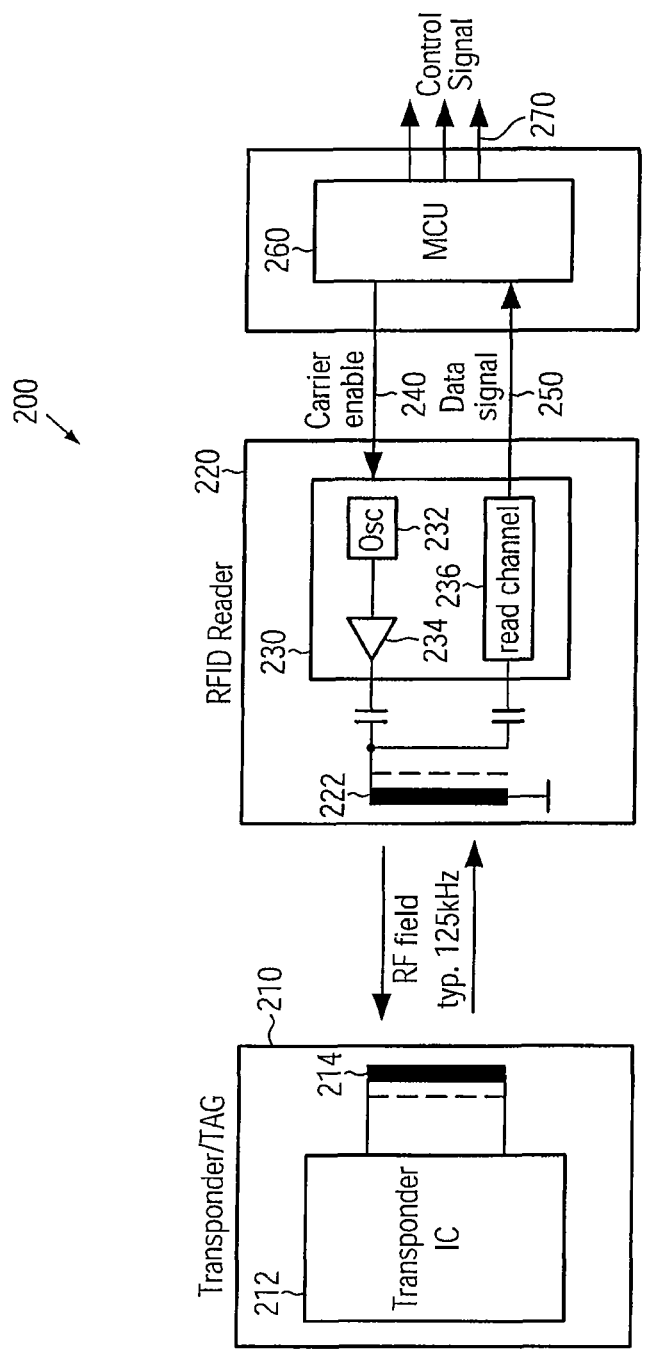
FIG. 2 shows a block diagram illustrating an RFID system for reducing reaction time according to an embodiment of the present invention.

With further reference to FIG. 2, an RFID system 200 according to an embodiment of the present invention is shown.

The system comprises an RFID reader 220, a microcontroller unit (MCU) 260 connected thereto, and a transponder 210. The MCU is illustrated as a separate device, but may also be comprised in the RFID reader. Further, the RFID reader 220 may be an RFID read/write base station. According to the illustrated embodiment, the RFID system 200 employs inductive coupling between the reader and a transponder entering the response range of the generated carrier field. RFID reader 220 comprises a coil antenna module 222 and an integrated circuit 230. Integrated circuit 230 as illustrated comprises on-chip oscillator 232, coil driver 234, and read channel module 236, but is not limited to this particular configuration.

In response to a carrier enable signal 240 provided by MCU 260, the reader 220 generates an electromagnetic carrier field with a typical frequency of 100 to 150 kHz. A frequently employed exemplary frequency of the carrier field is 120 or 125 kHz.

The system further comprises an RFID transponder/tag 210 comprising a transponder integrated circuit 212 and a coil antenna module 214. In the illustrated embodiment, if a transponder 210 enters the carrier field generated by RFID reader 220, the transponder 210 is powered up by energy transfer from the carrier field and then inductively couples with the primary coil of the reader, as the distance between both coils is such that the transponder is located in the near field of the antenna module 222 of the reader 220. The resonant transponder 210 extracts energy from the magnetic field of the reader 220. The extracted energy may be measured as a certain voltage drop across an internal resistance of the reader. The switching on and off of a load resistance of the transponder effects specific voltage variations at the antenna module 222 of the reader 220. A binary code signal stored at the transponder 210 controls the switching on and off of this load resistance, thereby transmitting a code signal from the transponder to the reader. This form of data transmission is called load modulation.

The read channel 236 demodulates an antenna voltage signal of the reader 220 and processes the demodulated signal to generate a data signal 250 comprising the received code signal. The data signal 250 is then provided to MCU 260 for evaluation.

In an embodiment, the identification code is programmed into the transponder integrated circuit 212. Conventionally, the code consists of one bank with four bytes. These bytes are emitted e.g. in Manchester code. In Manchester code, a bit sequence binarily modulates the phasing of a clock signal. Accordingly, Manchester code is one form of digital phase modulation which is also known as phase shift keying (PSK).

In a different embodiment, load modulation with auxiliary carriers may be utilized. In a further possible embodiment, which is not shown in FIG. 2, electromagnetic backscatter coupling may be employed. This technique employs much higher frequencies in the megahertz or gigahertz range and utilizes a modulation of the back scattered signal achieved by modulating the backscatter cross section of the transponder.

The MCU 260 provides the carrier enable signal 240 and receives the data signal 250 comprising the code signal. In accordance with an analysis of the received data signal 250 each time after the carrier enable signal is switched on, a control signal 270 is provided, which may be utilized for safety applications or security applications like access control.

By switching off and on the carrier enable signal 240, the carrier field is periodically disabled to reset the data signal 250 and periodically enabled to receive a first portion of the code signal of a passive transponder if such a transponder is located within the carrier field of the RFID reader. The code of the passive RFID transponder may then be validated on the basis of the first portion of the code signal only, and a control signal may be provided on the basis of the first portion of the code signal.

Figure 3:
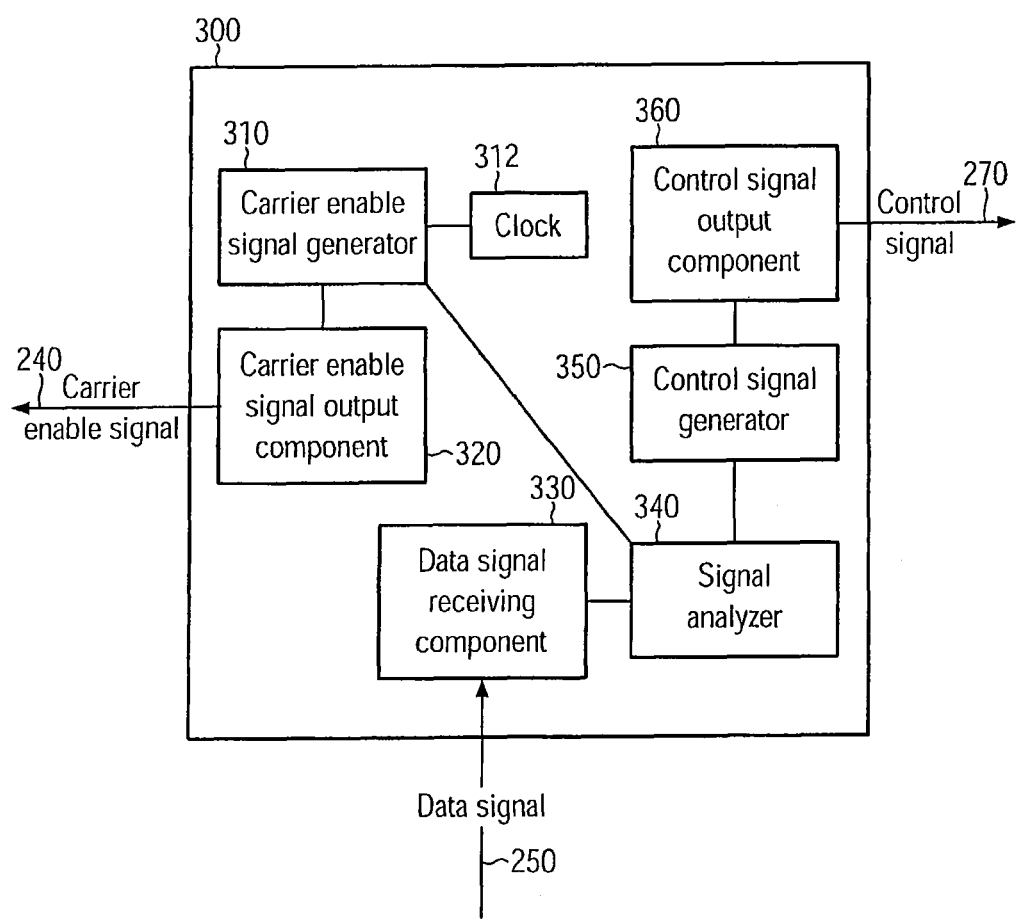
FIG. 3 shows a block diagram illustrating an RFID system control device according to an embodiment of the present invention.

With further reference to FIG. 3, an RFID system control device 300 according to an embodiment of the present invention is shown.

The device comprises a means 310 for generating a carrier enable signal. Apparatus 300 may further comprise a means 312 for clocking the carrier enable signal generator 310 so as to provide the carrier enable signal in a periodic or other predefined manner. Further, carrier enable signal output component 320 is comprised to output carrier enable signal 240 to an RFID reader device or an RFID read/write base station. A data signal receiving component 330 is provided for receiving a data signal 250 comprising a code signal from the RFID reader, wherein the code signal represents the code of a passive RFID transponder which is located in the carrier field of the RFID reader. The signal analyzer 340 is connected to the carrier enable signal generator 310 and therefore is informed about each resetting of the system by disabling the carrier enable signal including resetting the passive RFID transponder. Subsequent to each new enabling of the carrier field, the signal analyzer 340 reads the received first portion of the code signal, which according to embodiments of the present invention comprises a header or a header byte and the first byte of the transponder code. Signal analyzer 340 then validates the code of the passive RFID transponder on the basis of the first portion of the code signal only. Control signal generator 350 in combination with signal analyzer 340 generates a control signal on the basis of the first portion of the code signal. Control signal output component 360 outputs the generated control signal 270. It will further be understood that the means of apparatus 300 may be implemented as computer-executable components, hardware components, integrated circuit modules, MCU modules, or any combination thereof.

The inventive method, system, and apparatus facilitates reduced RFID reaction time, thereby allowing a timely provision of a control signal. While the present invention has been shown as described with reference to certain exemplary embodiments thereof, it will be understood by those skilled in the art that various changes in form and detail and combinations may be made therein without departing from the scope of the invention as defined by the appended claims. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

We claim:

1. A method of reducing RFID system reaction time, the method comprising:
   receiving a first transmission of a data signal, which comprises a code signal if a passive RFID transponder is located in a carrier field of an RFID reader, the code signal representing a code of the passive RFID transponder;
   disabling the carrier field to reset the data signal responsive to receiving the first transmission of the data signal;
   after disabling the carrier field, enabling the carrier field;
   after enabling the carrier field, receiving a first portion of the code signal from a second transmission of the data signal; and
   validating the code of the passive RFID transponder on the basis of the first portion of the code signal received in the second transmission of the data signal.

2. The method of claim 1, further comprising the step of providing a control signal on the basis of the first portion of the code signal received in the second transmission of the data signal.

3. The method of claim 1, wherein the first portion of the code signal is a header.

4. The method of claim 1, wherein the first portion of the code signal comprises a header and a first byte of the code of the passive RFID transponder, the code comprising at least four bytes.

5. The method of claim 1, the disabling comprising:
disabling the carrier field after the first portion of the code signal is received.

6. The method of claim 1, the disabling and enabling comprising:
disabling the carrier field after enabling the carrier field for a predetermined time period.

7. The method of claim 1, wherein the code of the passive RFID transponder is transmitted in Manchester Code.

8. The method of claim 2, wherein the control signal is a safety control signal or a security control signal.

9. The method of claim 1, wherein the disabling and enabling is performed in a periodic manner.

10. The method of claim 1, wherein the carrier field is enabled and disabled in accordance with a carrier enable signal.

11. An RFID system control device, the device comprising:
means for receiving a data signal, which comprises a code signal if a passive RFID transponder is located in a carrier field of an RFID reader, the code signal representing the code of the passive RFID transponder;
means for providing a carrier enable signal;
means for disabling the carrier field responsive to receiving a first transmission of the data signal to reset the data signal;
means to reenable the carrier field to receive a first portion of a second transmission of the data signal, which includes the code signal; and
means for validating the code of the passive RFID transponder on the basis of the first portion of the second transmission of the data signal.

12. The device of claim 11, further comprising:
means for providing a control signal on the basis of the first portion of the second transmission of the data signal.

13. The device of claim 12, wherein the control signal indicates the status of a monitored non-contact safety switch.

14. An RFID system comprising:
a microcontroller unit, MCU, for providing a carrier enable signal and receiving a data signal;
a passive RFID transponder including a code stored in the transponder, the transponder providing a response signal comprising the code when being located in a carrier field;
an RFID reader for generating the carrier field in response to receiving the carrier enable signal, receiving the response signal comprising the code, and providing the data signal comprising a code signal representing the code to the MCU,
wherein the MCU is configured to disable the carrier enable signal upon initially receiving a first transmission of the data signal, to subsequently reenable the carrier enable signal, to receive a second transmission of the data signal, and to validate the code from the second transmission of the data signal.

* * * * *